US008972532B2

(12) United States Patent
Mooney (10) Patent No.: US 8,972,532 B2
(45) Date of Patent: Mar. 3, 2015

(54) PROVIDING HARDWARE CONFIGURATION MANAGEMENT FOR HETEROGENEOUS COMPUTERS

(75) Inventor: Daniel T. Mooney, Sayville, NY (US)

(73) Assignee: CA, Inc., New York, NY (US)

( * ) Notice: Subject to any disclaimer, the term of this patent is extended or adjusted under 35 U.S.C. 154(b) by 1738 days.

(21) Appl. No.: 11/770,450

(22) Filed: Jun. 28, 2007

(65) Prior Publication Data

US 2008/0016199 A1    Jan. 17, 2008

Related U.S. Application Data

(60) Provisional application No. 60/806,393, filed on Jun. 30, 2006.

(51) Int. Cl.
*G06F 15/177* (2006.01)
*H04L 12/24* (2006.01)
*H04L 29/06* (2006.01)
*H04L 29/08* (2006.01)

(52) U.S. Cl.
CPC ........ *H04L 41/0806* (2013.01); *H04L 63/0823* (2013.01); *H04L 63/0869* (2013.01); *H04L 63/166* (2013.01); *H04L 67/34* (2013.01); *H04L 67/125* (2013.01)
USPC ...................................................... 709/220

(58) Field of Classification Search
CPC ..... G06F 9/5072; G06F 11/1417; G06F 9/46; G06F 21/575; G06F 11/2033; G06F 9/44; G06F 3/067
USPC ................................. 709/220, 223
See application file for complete search history.

(56) References Cited

U.S. PATENT DOCUMENTS

| 6,480,903 | B1 * | 11/2002 | Voutaz et al. .................. 719/328 |
| 7,444,621 | B2 * | 10/2008 | Pletcher et al. ............... 717/120 |
| 2002/0100034 | A1 * | 7/2002 | Croix ............................ 717/163 |
| 2002/0191756 | A1 * | 12/2002 | Guedalia et al. ........... 379/88.13 |
| 2004/0103220 | A1 * | 5/2004 | Bostick et al. ................ 709/253 |
| 2005/0187894 | A1 * | 8/2005 | Pletcher et al. .................... 707/1 |
| 2005/0283779 | A1 * | 12/2005 | Pronk van Hoogeveen et al. ............................. 717/177 |
| 2006/0080672 | A1 * | 4/2006 | Smith et al. .................... 719/317 |
| 2006/0130072 | A1 * | 6/2006 | Rhoten et al. ................. 719/321 |

(Continued)

OTHER PUBLICATIONS

Secure Provisioning for PCs with Intel Chipset and Intel Active Management Technology, by Intel Corporation, Sep. 2005.*

(Continued)

*Primary Examiner* — Backhean Tiv
(74) *Attorney, Agent, or Firm* — Baker Botts L.L.P.

(57) ABSTRACT

In certain embodiments, a method for providing hardware configuration management for one or more heterogeneous computers utilizing a LAN controller with imbedded remote management capabilities technology comprises receiving an initiation request from a LAN controller. A list of FPACL vendors is then obtained from the LAN controller. The LAN controller is configured according to the predetermined requirements of the FPACL vendors. The LAN controller may be configured according to the predetermined requirements of non-FPACL vendors. The list of non-FPACL vendors and the received FPACL vendors along with the corresponding predetermined requirements for proper configuration may be stored on a central server or on a plurality of devices accessible to the central server. Connection to the LAN controller may be through a network. An exemplare LAN controller is an INTEL® AMT device.

21 Claims, 4 Drawing Sheets

(56) References Cited

U.S. PATENT DOCUMENTS

| | | | |
|---|---|---|---|
| 2007/0113186 A1* | 5/2007 | Coles et al. | 715/735 |
| 2007/0297396 A1* | 12/2007 | Eldar et al. | 370/356 |
| 2008/0016199 A1* | 1/2008 | Mooney | 709/223 |

OTHER PUBLICATIONS

Intel Active Management Technology Quick Reference, 2005.*

Intel Active Management Technology v3 (iAMT), 2005.*

Intel Active Management TEchnology, TEchnical Overview for DEsktop Enablement, 2005.*

Intel Active Management TEchnology with system defense feature quick start guide, 2006.*

How to set up AMT Machine, Intel Ative Management TEchnology, Aug. 28, 2006.*

Intel Active Management Technology, Technical Overview for Desktop Enablement, by Intel, copyrighted 2005, pp. 1-33.*

* cited by examiner

PROVIDING HARDWARE CONFIGURATION MANAGEMENT FOR HETEROGENEOUS COMPUTERS

RELATED APPLICATIONS

This application claims priority to U.S. Provisional Patent Application Ser. No. 60/806,393, filed Jun. 30, 2006.

TECHNICAL FIELD

The present invention relates generally to computer systems management and more particularly to providing configuration management for one or more heterogeneous computers.

BACKGROUND

Entities such as enterprises frequently communicate and conduct business operations using a variety of computers and other devices that include various hardware components that need to be managed. Typically, computers and hardware components are connected through a network, such as a local area network (LAN). The network often includes hardware and software provided from various third parties that must have the ability to communicate and cooperate with each other in order to provide communication and other services. Configuration and management of hardware and software of a particular network can be time consuming, expensive, and susceptible to error.

In order to address the increasing costs associated with managing the hardware configuration of an entity's variety of computers, Intel launched new hardware technology referred to as INTEL® ACTIVE MANAGEMENT TECHNOLOGY (INTEL® AMT). An INTEL® AMT device may be purchased from Intel Corporation, located at 2200 Mission College Boulevard, Santa Clara, Calif. Hereinafter, INTEL® AMT hardware and INTEL® AMT device are used interchangeably. The INTEL® AMT hardware contains imbedded remote management capabilities.

The setup feature of the present invention provides network settings, Transport Layer Security (TLS) settings, etc. TLS provides secure communications over the out of band network interface between the INTEL® AMT device on the client and a management console. The configuration feature includes INTEL® AMT Security Administration, reset to factory defaults, Kerberos configuration, etc.

The INTEL® AMT hardware has an agent that resides on embedded firmware that can accept commands from a management console or server. This technology allows an entity's computers connected to the network to be configured from a central location rather than manually configuring the hardware of each computer. The default state of INTEL® AMT hardware is an unconfigured state and is not accessible by management applications of third parties. Factory Mode Setup is a process of preparing an INTEL® AMT device to receive its configuration settings from a Setup and Configuration Application (SCA). For example, the configuration for initial BIOS settings required to prepare the device for secure communications may be part of an SCA.

Computers utilizing INTEL® AMT hardware may be pre-configured with the hardware configuration management server's IP address and port number using the INTEL® AMT BIOS extension or the default of hostname=ProvisionServer and default port number of 9971. These computers may also be further configured, remotely or manually, in order to implement the management capabilities provided by the INTEL® AMT hardware. The INTEL® AMT hardware allows for only one independent software vendor's (ISV) management software to configure the hardware of a computer utilizing the INTEL® AMT hardware. However, entities may have several ISV software applications running concurrently on a single server or multiple dedicated servers. Many of these ISV applications require product specific customization of networked computers in order for the ISV application to operate properly across the network. The ability to remotely configure multiple devices or computers utilizing the INTEL® AMT hardware reduces costs not only associated with man-power but also reduces errors during configuration. Remote configuration with multiple ISV software applications also provides greater utility and versatility for the enterprise.

SUMMARY

According to the present inventions, disadvantages and problems associated with remote configuration of one or more heterogeneous computers may be reduced or eliminated.

In certain embodiments, a method for providing remote hardware configuration management for one or more heterogeneous computers utilizing a LAN controller with imbedded remote management capabilities, the method comprises receiving an initiation request from the LAN controller. A request for one or more Free Partner Access Control List (FPACL) vendors from the LAN controller is made. One or more FPACL configuration requirements are determined for at least one of the FPACL vendors. The method further includes configuring the LAN controller based, at least in part, on at least one of the FPACL configuration requirements. The FPACL configuration requirements may be FPACL vendor specific requirements. In certain embodiments the FPACL vendor configuration requirements are found in a dynamically linked library (DLL) or may be found in shared object library (SO) associated with a specific FPACL vendor. If a DLL or SO for a specific vendor exists, then entry points in the DLL and SO are called which allow a specific vendor to configure the LAN controller according to that vendor's specific requirements. In another embodiment, the method locates a non-FPACL vendor list on the server. Just as for the FPACL vendors, one or more non-FPACL configuration requirements are determined for at least one of the non-FPACL vendors. The method further includes configuring the LAN controller based, at least in part, on at least one of the non-FPACL configuration requirements. The non-FPACL configuration requirements may be non-FPACL vendor specific requirements.

In other example embodiments, the method stores one or more message parameters included in the initiation request. The message parameters include at least one unique identifier which maps to at least one of the FPACL configuration requirements. The LAN controller is further configured based, at least in part, on the unique identifier.

In another embodiment, a TLS communication protocol is utilized if a certificate exists. In certain embodiments, if a certificate does not exist, the certificate is generated and TLS communication protocol is utilized. In other embodiments, a certificate does not exist and non-TLS communication protocol is utilized.

According to one embodiment a system for remotely configuring one or more heterogeneous computers utilizing a LAN controller with imbedded remote configuration management capabilities comprises the use of a processor, wherein a communication link exists between the processor and the one or more heterogeneous computers. A memory is connected to the processor that stores a hardware configuration management software application. The hardware configuration management software application is operative to control the operation of the processor. An FPACL vendor file is also stored in the memory. The processor is operative with the hardware configuration management software application to request one or more FPACL vendors from the one or more heterogeneous computers, receive an FPACL vendor list; determine one or more FPACL configuration requirements for at least one of the FPACL vendors listed in the FPACL vendor list, and configure the LAN controller device based, at least in part, on at least one of the FPACL configuration requirements.

In one embodiment, the LAN controller is an INTEL® AMT device. An INTEL® AMT device is used throughout this specification as an exemplary LAN controller. The present invention is not limited to an INTEL® AMT device and encompasses any suitable LAN controller with imbedded remote management capabilities.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which.

DESCRIPTION OF EXAMPLE EMBODIMENTS

The teachings of the present invention provide for configuring devices with embedded INTEL® AMT hardware with security as defined by the Enterprise such as user credentials for TLS, User Access Control Lists (ACLs), HTTP Mutual Authentication, Kerberos accounts, Active Directory Objects (ADO), etc. The present invention also allows for the setup of networking attributes unique to each device. Furthermore, the teachings of the present invention will maintain the devices internal tables as defined by an administrator, typically the Corporate or Enterprise Administrator. When the device itself has been configured, the present invention allows for the building of a Provision Extended Markup Language (XML) document that will be passed to any ISV supplied routine or function defined in a Free Partner Access Control List (FPACL) table. This allows ISVs that are defined as Intel Partners to perform configuration of an INTEL® AMT device needed for their respective product(s). Once this is complete, an additional ISV list file may be scanned to allow ISVs not defined in the FPACL table to perform configuration for their respective product(s).

After all of the ISV initialization/customization is complete, the invention will perform maintenance of (i.e., change) the Administrator UserID and Password of the INTEL® AMT device. It is desirable to change the INTEL® AMT device Administrator UserID and Password to prevent an ISV from logging the UserID and Password which would cause significant security exposure.

There are several methods for generating the new INTEL® AMT device Administrator UserID and Password. A particular method is determined according to the value of a variable. First, if a specified value indicates plain text should be used, an Administrator UserID and Password are generated using ASCII characters. All devices will use this text data and have the same Administrator UserID and Password. In another embodiment, if the value of the variable corresponds to $DEFAULT, the invention will generate an Administrator UserID and Password for each device. Likewise, if $CUSTOM is specified, the Enterprise will be required to supply a unique routine that will be called with the generated Provision.XML document and must return an Administrator UserID and Password that will be written to each device. Further, if $PROMPT is the value, the user is prompted to manually enter a password when the provisioning server is used to provision the INTEL® AMT enabled devices.

Thus, a hardware configuration management software application may allow for initial hardware configuration of one or more computers utilizing INTEL® AMT hardware while providing for these same computers to be configured according to other ISV hardware configuration requirements. Particular embodiments of the invention are described more fully with respect to the attached figures.

Figure 1:
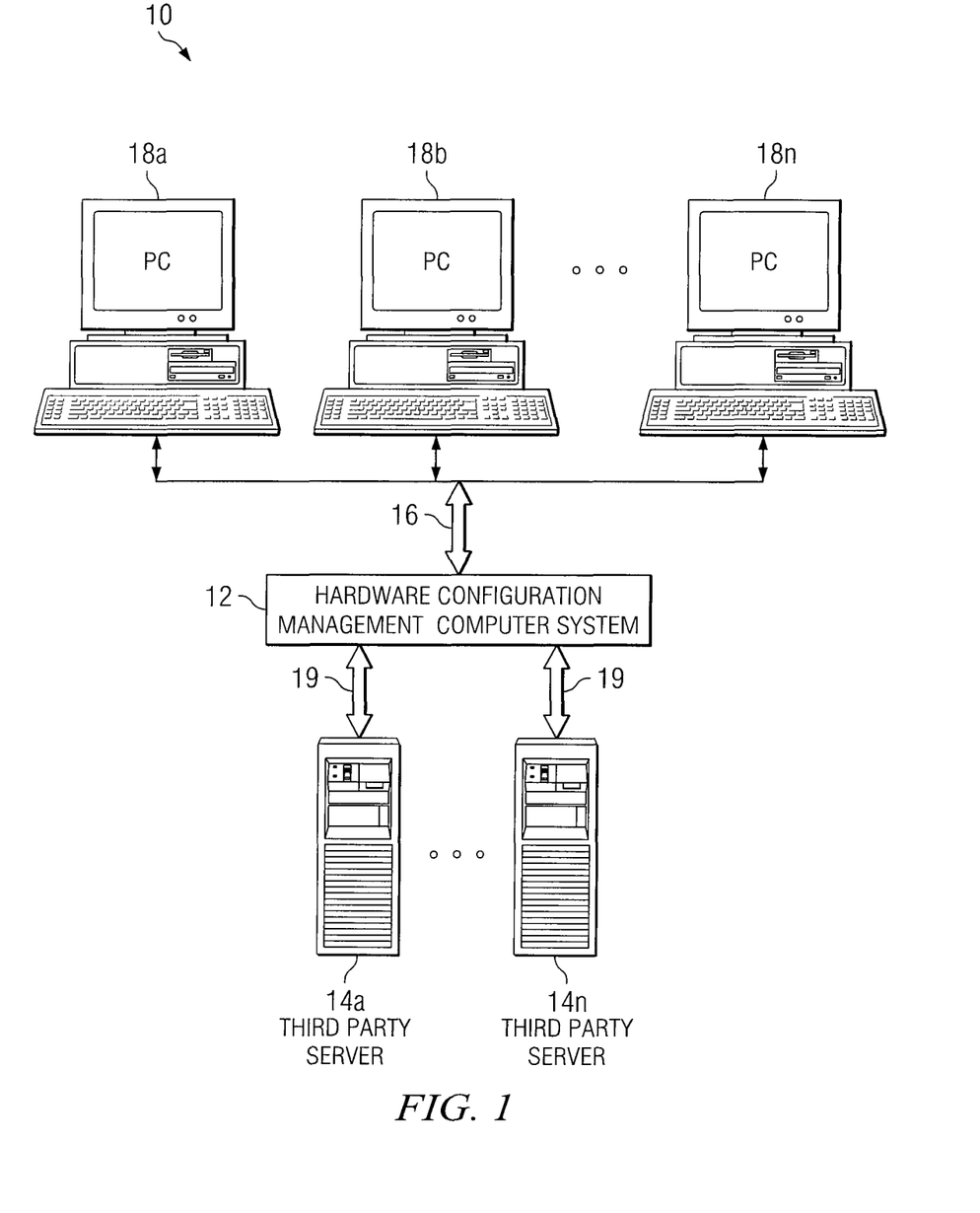
FIG. 1 illustrates an example system for providing configuration management for one or more heterogeneous computers utilizing INTEL® AMT hardware according to certain embodiments of the present invention.

FIG. 1 illustrates an example system 10 for providing hardware configuration management for one or more heterogeneous computers utilizing INTEL® AMT hardware according to certain embodiments of the present invention. System 10 includes multiple computers 18a, 18b, and 18n and a hardware configuration management computer system 12. In general, hardware configuration management computer system 12 may be a central server such as those available from companies such as Siemens, Hewlett Packard, Fujitsu, and Dell. The heterogeneous computers 18a, 18b, and 18n may be connected to the hardware configuration management computer system 12 through a network 16. Although this particular implementation of system 10 is illustrated and primarily described, this is for exemplary purposes only, and the present invention contemplates any suitable implementation of system 10.

Computers 18a, 18b, and 18n may be heterogeneous. For example, computers 18a, 18b, and 18n may include different types of computers and may be provided by a variety of vendors. In certain embodiments, computers 18a, 18b, and 18n may include one or more of the following types of computers: personal computers (PC), workstation, notebook computers, or any other suitable device utilizing the INTEL® AMT hardware. Vendors of computers 18a, 18b, and 18n may include: Dell, IBM, Hewlett Packard, Fujitsu, and/or Siemens. Computers 18a, 18b, and 18n may also utilize a variety operating systems including, but not limited to, WINDOWS, other Microsoft operating systems, LINUX, and any other suitable operating system known to one of ordinary skill in the art. Computers 18a, 18b, and 18n may exist entirely within a single entity, such as a business enterprise, or may span multiple entities.

Hardware configuration management computer system 12 may comprise one or more computer systems operable to facilitate hardware configuration management of computers 18a, 18b, and 18n. In a particular embodiment, hardware configuration management computer system 12 comprises at least one computer as a central server hosting the hardware configuration management software application. The hardware configuration management software application configures the INTEL® AMT hardware of computers 18a, 18b, and 18n. Hardware configuration management computer system 12 may include any suitable combination of firmware, software, or hardware for managing hardware configuration of computers 18a, 18b, and 18n. It is not a requirement that the hardware configuration management computer system 12 utilize INTEL® AMT hardware. The present invention contemplates system 10 including any suitable number of hardware configuration management computer systems 12, according to particular needs.

Hardware configuration management computer system 12 may be coupled to computers 18a, 18b, and 18n via a network 16. Network 16 facilitates wireless or wireline communication. Network 16 may allow for communications, for example, via Internet Protocol (IP) packets, Frame Relay frames, Asynchronous Transfer Mode (ATM) cells, voice, video, data, and other suitable information between network addresses. Network 16 may include one or more local area networks (LANs), radio access networks (RANs), metropolitan area networks (MANs), wide area networks (WANs), all or a portion of the global computer network known as the Internet, and/or any other communication system or systems at one or more locations.

Other computers in system 10 may be dedicated servers 14a and 14n for implementing ISV management applications providing a variety of services from a variety of vendors. Such ISV management application vendors may include Symantec, Cisco, Checkpoint, Calif., and/or BMC. Each of these ISV management applications may require unique hardware configuration of computers 18a, 18b, and 18n in order for proper execution of the application. The ISV management applications requirements for hardware configuration must be available to the hardware configuration management computer system 12 in order to uniquely configure the hardware of computers 18a, 18b, and 18n. Hardware configuration management computer system 12 may be coupled to servers 14a and 14n via a network 19.

It is often desirable to manage hardware configuration of computers 18a, 18b, and 18n using hardware configuration management computer system 12 for example. A hardware configuration management software application may enable a user, such as a systems administrator, to manage the hardware configuration of computers 18a, 18b, and 18n remotely rather than manually configuring the INTEL® AMT hardware of each of the computers 18a, 18b, and 18n connected to the network 16. System 10 may be used to manage the hardware configuration of one or more heterogeneous computers 18a, 18b, and 18n. In certain embodiments, hardware configuration management computer system 12 may be used to manage computers 18a, 18b, and 18n of different types and from different vendors. As used in this description, managing hardware configuration of computers 18 may include, but is not limited to, one or more of setting the administrator identification and password, host name, security, internal tables, memory allocation, and other network attributes.

Figure 2:
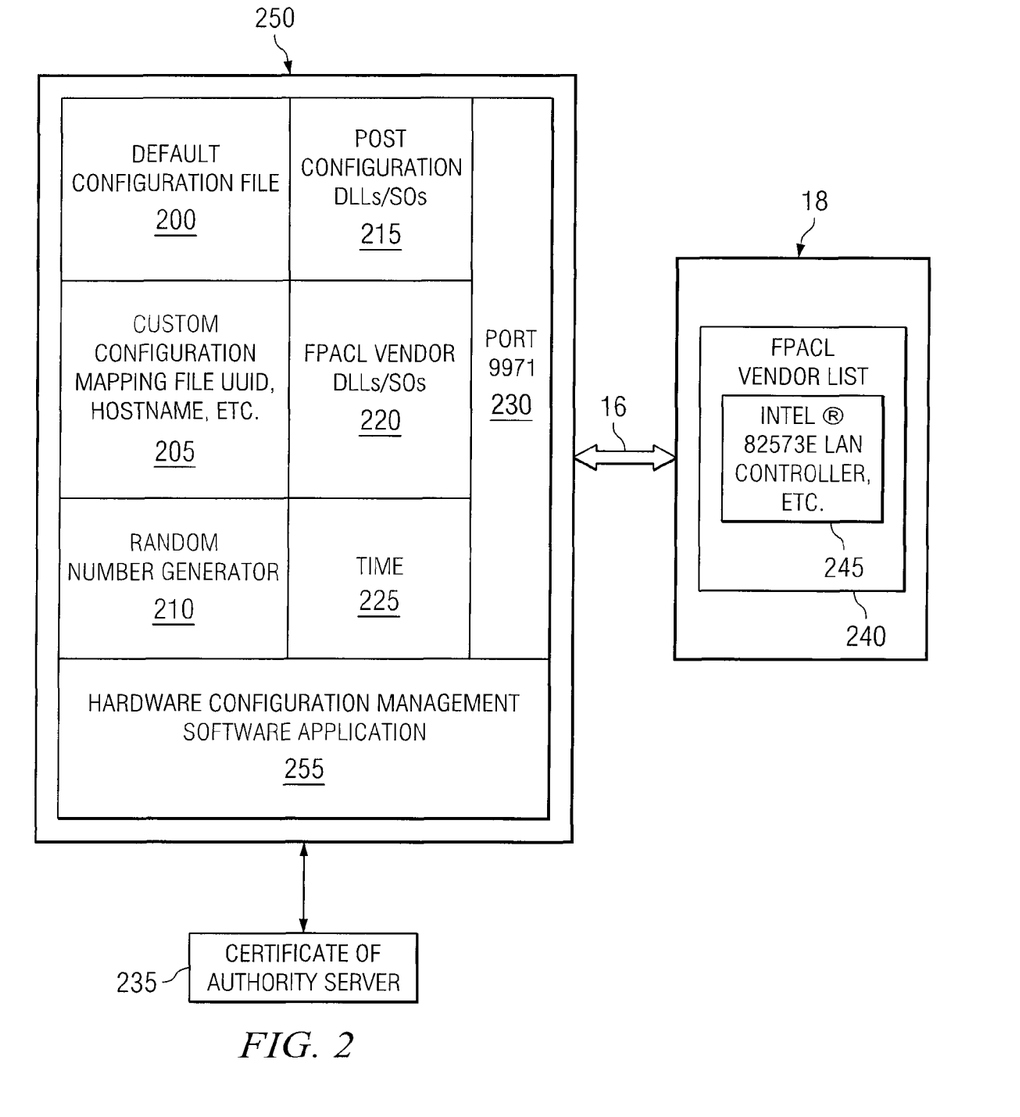
FIG. 2 illustrates in more detail certain aspects of an example system for providing a unified user interface for managing one or more heterogeneous computing environments according to certain embodiments of the present invention.

FIG. 2 illustrates in more detail certain aspects of example system 10 for providing for hardware configuration management for one or more heterogeneous computers 18 utilizing INTEL® AMT hardware, according to certain embodiments of the present invention. Although this particular implementation of system 10 is illustrated and primarily described, this is for exemplary purposes only, and the present invention contemplates any suitable implementation of system 10.

System 10 may include a hardware configuration management computer system 12 for hosting the hardware configuration management software application 255. The hardware configuration management computer system 12 may include a central server 250. The central server 250 may communicate via a LAN network 16, as an example, to computer 18. Computer 18 is shown in this particular detailed implementation of system 10 for exemplary purposes only. The present invention contemplates multiple computers such as 18a, 18b, and 18n connected to the central server 250 via the LAN 16. The central server 250 may also communicate with a certificate of authority server 235 and with other dedicated ISV servers 14a and 14n.

Computer 18 includes an INTEL® AMT device. One exemplar INTEL® AMT device is an INTEL® 82573E LAN CONTROLLER 245, available for purchase from Intel Corporation, located at 2200 Mission College Boulevard, Santa Clara, Calif., that contain embedded management capabilities. While the INTEL® 82573E LAN CONTROLLER 245 has been designated, the invention is not limited to this device but encompasses any device based on the INTEL® AMT hardware design.

Central server 250 may include a hardware configuration management software application 255 that is operable to remotely configure the INTEL® 82573E LAN CONTROLLER 245 of computer 18. Central server 250 may also be referred to as a provisioning server. Provisioning is the procedure through which the INTEL® AMT enabled device is configured, for instance, populated with a username, a password, network parameters, and TLS certificates necessary for encrypted communications. Provisioning and configuring are used interchangeably hereinafter. In general, provisioning may be a two step process. The INTEL® 82573E LAN CONTROLLER 245 must be pre-configured, generally by OEMs, using the INTEL® AMT BIOS extension before it is accessible to any management software application. The pre-configuration requirement is a limitation of the INTEL® 82573E LAN CONTROLLER 245 and not of the invention. Other INTEL® AMT devices may allow for remote pre-configuration.

The first step is known as pre-configuration or pre-provisioning and is used to configure the administrator username and password, the central server's IP address and port number using the INTEL® AMT BIOS extension. The present invention contemplates the remote configuration, now performed generally by OEMs, so as to make the entire configuration of the INTEL® 82573E LAN CONTROLLER 245 a zero touch process. Step two may be performed remotely and is used to allocate some memory blocks, changing user access control lists (ACLs), providing configuration certificates, and any other pre-configuration requirements known to one of ordinary skill in the art.

In certain embodiments, hardware configuration management software application 255 implemented on central server 250 may access a predetermined directory structure. The directory structure may contain directories for a default configuration file 200, mapping file 205, post configuration DLLs 215, FPACL vendor DLLs 220, and any other files necessary for configuration of the INTEL® 82573E LAN CONTROLLER. A default configuration file 200 may include information common for all computers on the network, such as 18a, 18b, and 18n. Such information may include host name, domain name, passwords, network information, and trusted certificate files. In accordance with a particular embodiment of the present invention, the administrator will update a mapping file 205 that may include information regarding the INTEL® 82573E LAN CONTROLLER 245 such as provisioning ID/provisioning passphrase (PID/PPS) key pairs, host name, host operating system name, administrator user name and administrator password. The mapping file 205 allows for unique configuration of each INTEL® 82573E LAN CONTROLLER 245.

The hardware configuration management software application 255 is operable to configure the INTEL® 82573E LAN CONTROLLER 245 for transport layer security (TLS) mode which requires certificate of authority server 235 to generate certificates. Generated certificates are placed within the predetermined directory structure for access by the hardware configuration management software application 255. If the hardware configuration management software application 255 does not detect a certificate, the INTEL® 82573E LAN CONTROLLER 245 may be configured to operate in non-TLS mode.

Hardware configuration management software application 255 may also utilize a random number generator object 210. Random number generator object 210 generates a key to be used by the INTEL® 82573E LAN CONTROLLER 245 to generate random numbers for security purposes. Hardware configuration management software application 255 may also utilize a time object to set time on the INTEL® 82573E LAN CONTROLLER 245 in order to perform mutual authentication.

Computer 18 as well as computers 18a, 18b, and 18n include INTEL® AMT hardware. For instance, in one embodiment computers 18a, 18b, and 18n include an INTEL® 82573E LAN CONTROLLER 245. By default, the INTEL® 82573E LAN CONTROLLER 245 is pre-programmed with an FPACL Vendor List 240. The FPACL Vendor List 240 contains a list of Intel Partners. When computers 18a, 18b, and 18n are initially connected to the network 16, after pre-configuration, the INTEL® 82573E LAN CONTROLLER 245 attempts to communicate with the central server 250 by sending an initiation request via network 16. Hardware configuration management software application 255 listens for socket connections via network 16 on a configurable port, port 9971 by default, from the INTEL® 82573E LAN CONTROLLER 245 device. Upon successful connection, the INTEL® 82573E LAN CONTROLLER 245 may send an initiation request, generally referred to as a "HELLO" message, to the central server 250. This message may include parameters such as the version of INTEL® AMT hardware, UUID, and PID. The hardware configuration software application 255 may utilize the parameters to configure the INTEL® 82573E LAN CONTROLLER device 245 according to the default configuration file 200 and the mapping file 205.

Each ISV designated in the FPACL Vendor List 240 may provide corresponding FPACL Vendor DLLs/SOs 220. In general, Microsoft or WINDOWS users will use a dynamically linked library (DLL), and LINUX users will use a shared object (SO) library. Therefore, DLL and SO may be used interchangeably throughout this specification. It is not a limitation of the present invention for the FPACL vendor files associated with an FPACL Vendor from the FPACL Vendor List 240 to be a DLL or SO type file. Any extension indicative of a file type that may be used for provisioning an INTEL® 82573E LAN CONTROLLER 245 with vendor specific requirements known to one of ordinary skill in the art may be utilized.

Hardware configuration management software application 255 may utilize the DLLs/SOs 220 to further configure the INTEL®T 82573E LAN CONTROLLER 245 according to the unique requirements of each ISV. Hardware configuration management software application 255 may further configure INTEL® 82573E LAN CONTROLLER 245 by utilizing post configuration DLLs/SOs 215. Post configuration DLLs 215 may include ISVs not included in the FPACL Vendor List 240. Though certain embodiments of this invention utilize DLLs as the mechanism for configuring the INTEL® AMT device with the ISV's hardware configuration requirements, the present invention contemplates the use of other programming mechanisms.

In order to maintain security, vulnerable information such as administrator username and passwords may be encrypted before being stored in memory variables on the INTEL® 82573E LAN CONTROLLER 245.

Figure 3A:
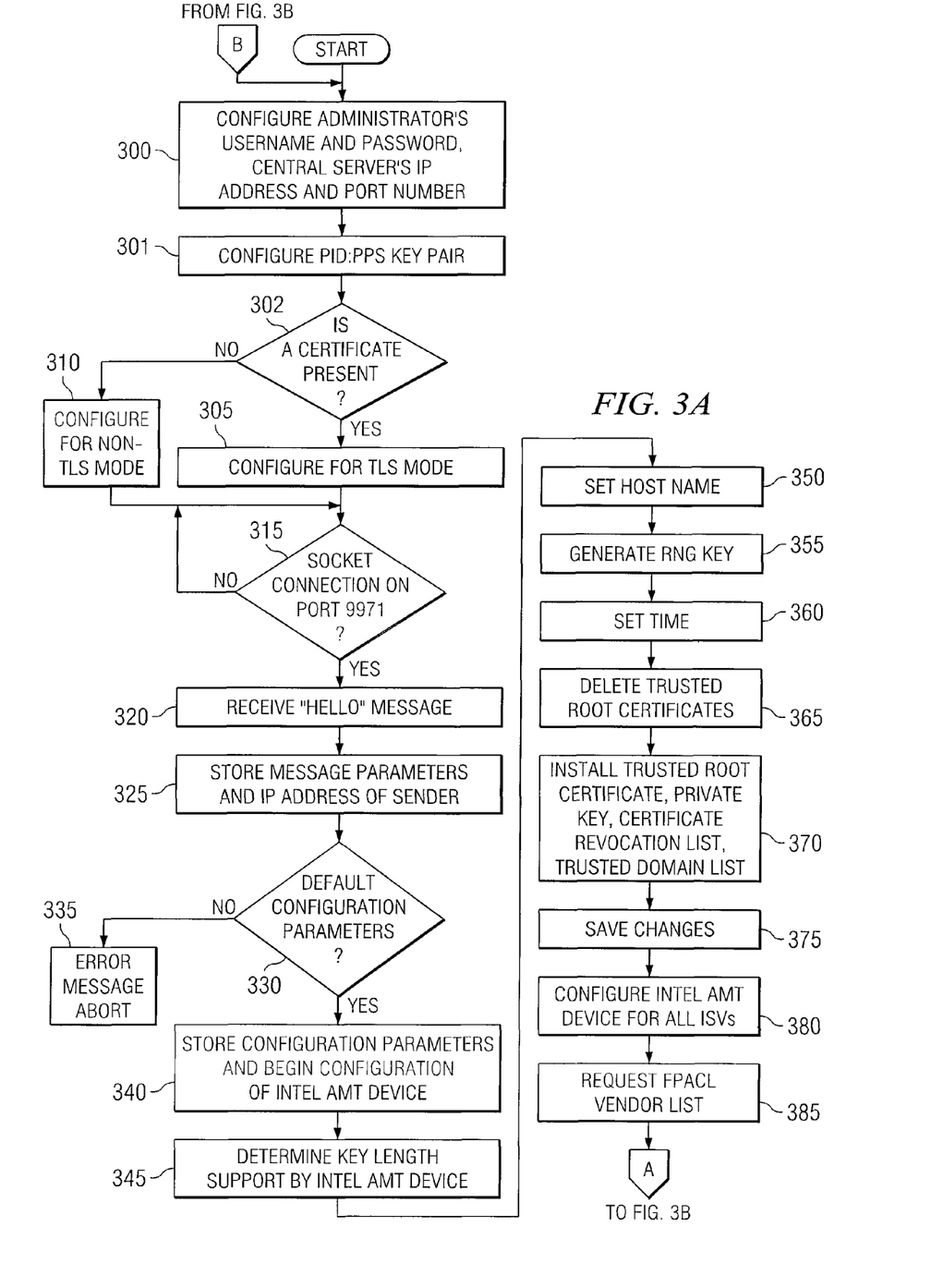
FIG. 3 illustrates an example method for providing a configuration management for one or more heterogeneous computers utilizing INTEL® AMT hardware according to certain embodiments of the present invention.
Figure 3B:
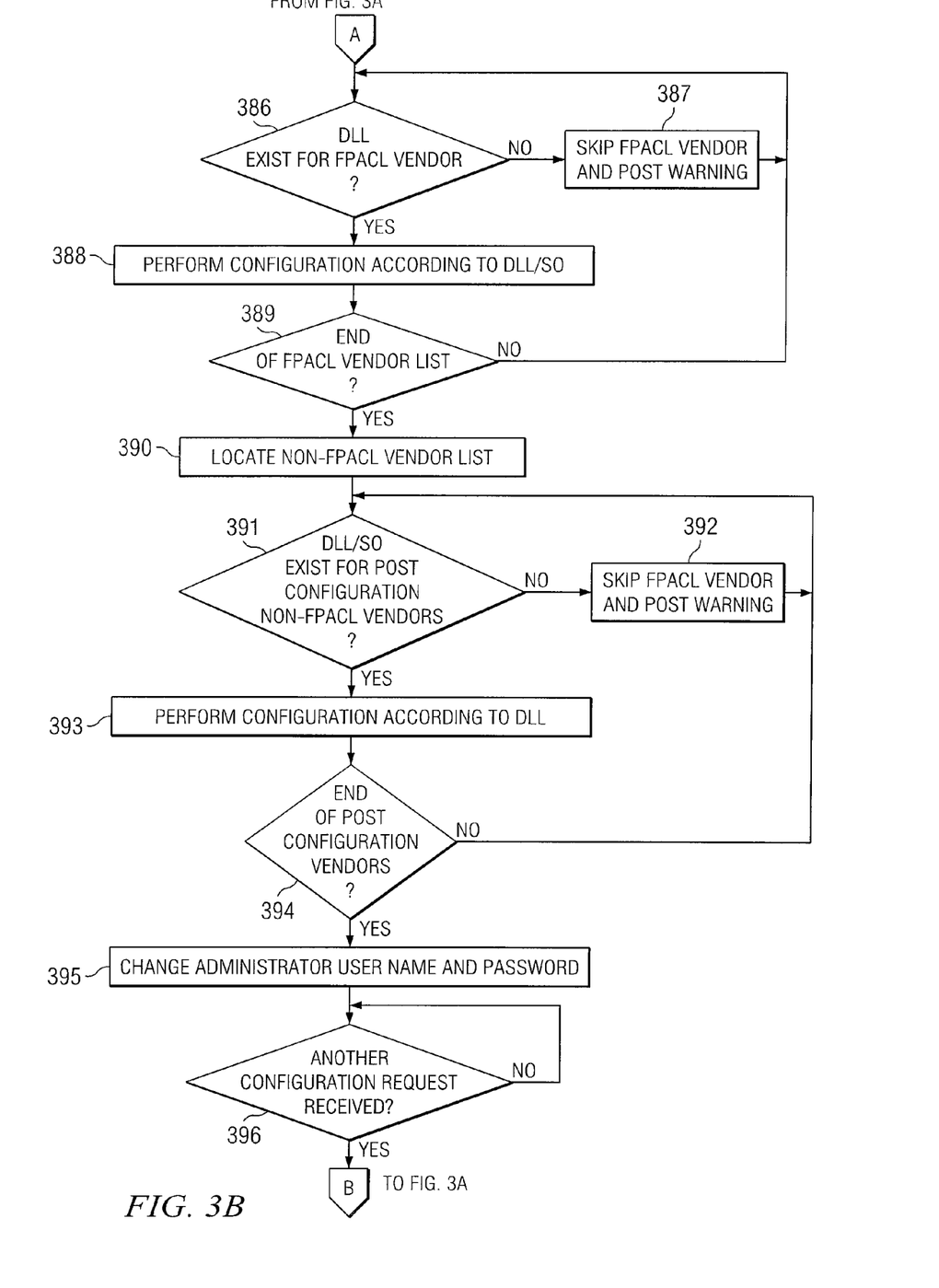

FIG. 3 illustrates an example method for providing a central server to host a hardware configuration management software application for managing the hardware configuration for one or more heterogeneous computers 18a, 18b, and 18n according to certain embodiments of the present invention. Computer 18 is representative of computers 18a, 18b, and 18n collectively. As such, computer 18 and computers 18a, 18b, and 18n are used interchangeably hereinafter.

As stated earlier, the INTEL® AMT hardware 245 must be configured or provisioned. To begin, the INTEL® AMT hardware must be pre-configured with the administrator's username and password for the INTEL® AMT device 245. INTEL® AMT device 245 may also be configured with the central server's 250 IP address and port number 300. By default, the central server's 250 host name is "Provision-Server." If this default host name is not available for a particular enterprise's network, each INTEL® AMT device 245 may be configured with the central server's 250 user selected host name.

A PID/PPS key pair is configured 301 for each INTEL® AMT device 245 to provide for secure initial communication with encryption between each INTEL® AMT device and the provisioning server 250.

At step 302, the hardware configuration management software application 255, which is operable on the central server 250, performs a check to determine whether a certificate is available on the central server 250. Central server 250 may be configured with a certificate or may request a certificate from a certificate of authority server 235. This certificate is used to generate and sign certificates during configuration of any INTEL® AMT hardware, such as the INTEL® 82573E LAN CONTROLLER 245 of computer 18. The certificate may be stored in a predetermined directory structure with a predetermined filename for later use by the hardware configuration management software application 255. In certain embodiments, a certificate is generated, the central server 250 is restarted and the central server 250 provisions any INTEL® AMT devices connected to the network 16 in TLS mode.

If a certificate is available, the INTEL® AMT hardware will be configured to operate in TLS Mode 305 which provides a level of security in all transmissions. If a certificate is not available, the user, typically the system administrator, may be prompted by the central server 250 with a request for authority to obtain a certificate. If the user responds in the negative or if no prompt is given, the hardware configuration management software application 255 may proceed with configuration in non-TLS mode 310.

If running in enterprise mode a certificate may be sent to the INTEL® AMT device 245. The certificate allows for a new PID to be used rather than the initial PID from step 300.

Using this new PID/PPS key pair, INTEL® AMT device 245 utilizes encrypted communication for all transmissions.

Once the INTEL® AMT hardware 245 utilized by computers 18a, 18b, and 18n is pre-configured, it attempts to connect to the central server 250. By default, the INTEL® AMT device 245 attempts to connect to the central server 250 via socket connections on port 9971. If port 9971 is not available for a particular central server 250, the port for communications with the INTEL® AMT device 245 may be changed from the command line at the central server 250 which would also necessitate each INTEL® AMT device 245 being configured with the changed port information. At step 315, the hardware configuration software management application 255 awaits socket connections on the identified port. Hereinafter port 9971 will be used as the identified port.

Once a connection is established with the central server 250, the INTEL® AMT device 245, sends an initiation request to the central server 250, typically referred to as a "HELLO" message. The format of the "HELLO" message may depend upon the version of the INTEL® AMT device 245. In one embodiment, the INTEL® AMT device 245 opens socket #1 to send the "HELLO" message to port 9971 on central server 250. The INTEL® AMT hardware 245 opens a second socket #2 to implement the TLS protocol, i.e. openSSL, using the INTEL® AMT device's 245 PPS as the secure key. After sending the "HELLO" message, the INTEL® AMT 245 will disconnect from the central server 250.

When the "HELLO" message is received 320 by the hardware configuration management software application 255 instructions are executed in a batch script to look up in a mapping file the PPS corresponding to the PID received in the "HELLO" message. Although a batch script is primarily described, this is for exemplary purposes only, and the present invention contemplates any suitable implementation of mapping the PID to its corresponding PPS. The batch script opens a socket with openSSL using its unencrypted PPS retrieved from the mapping file as the secure key. When this secure process is complete, both sockets opened with openSSL are closed and provisioning now occurs using TLS, TLS with Mutual Authentication or HTTP digest depending on the release of the INTEL® AMT hardware 245 and parameters set in the mapping file. The message parameters and IP address of the sender of the "HELLO" message are stored 325. At step 325, the central server 250 will save the message parameters and IP address of the requesting INTEL® AMT device 245.

Default configuration parameters are obtained 330 from a default configuration file (e.g., mapping file) based on a key or unique identifier, such as the UUID, PID or Asset Tag. Default configuration parameters are extracted from message parameters previously received from the "HELLO" message. These default configuration parameters are specific to the INTEL® AMT device 245 and may include type of authentication (mutual authentication, TLS, digest), host name, and host OS name. If the key or unique identifier received does not map to a corresponding host name in the default configuration file 200 or in the custom configuration mapping file 205 of central server 250, an exception is thrown and the hardware configuration of the INTEL® AMT device 245 is aborted 335.

At step 340, the configuration parameters obtained are stored and the hardware configuration management software application 255 will begin the hardware configuration or provisioning of the INTEL® AMT device 245. The key length supported by the INTEL® AMT device 245 must be determined 345. The key length is used, in part, to create the private key and certificate of the appropriate length for further communications with the INTEL® AMT device 245. The host name of the INTEL® AMT device 245 is set 350 according to the information stored in step 340. A random number generator (RNG) key is generated 355 for use by the INTEL® AMT device 245 for generation of random numbers for authentication purposes.

Next, time is set 360 on the INTEL® AMT device using the Network Time Realm in order to perform mutual authentication. Existing trusted root certificates on the INTEL® AMT device 245 are deleted 365. A new trusted root certificate along with the private key, a Certificate Revocation List and a Trusted Domain List are installed 370 on the INTEL® AMT device 245. The hardware configuration management software application 255 instructs the INTEL® AMT device 245 to initiate its commit changes function so that all changes and installations 375 of prior steps are saved in memory for future use.

With the basic configuration of the INTEL® AMT device 245 completed, the hardware configuration management software application 255 begins configuration of the INTEL® AMT device 245 for ISVs at step 380 which allows all the ISVs to share the same INTEL(k AMT device 245. The central server 250 may be provisioned with a list of default FPACL vendors and associated requirements for each specific FPACL vendor. An administrator may change the default requirements for any of the FPACL vendors. For instance, an administrator may change the amount of memory allocation allowed during provisioning by a particular FPACL vendor.

Each INTEL® AMT device 245 contains a default FPACL vendor list 240. The hardware configuration management software application 255 requests the FPACL vendor list 240 from the INTEL® AMT device 245 at step 385. The hardware configuration management software application 255 determines whether changes have been made to the default FPACL vendor requirements stored in a database or other file system on the central server 250. If changes have been made, the hardware configuration management software application 255 transmits to the INTEL® AMT device 245 the changed FPACL vendor requirements. The INTEL® AMT device 245 overwrites the default FPACL vendor list with the customized FPACL vendor requirements. During provisioning of the INTEL® AMT device 245 the customized FPACL vendor requirements are utilized. If no changes have been made to the default FPACL vendor requirements, the hardware configuration management software application 255 utilizes the INTEL® AMT device's 245 default FPACL vendor list.

In step 386, the hardware configuration management software application 255 attempts to locate in the central server 250 directory structure a corresponding FPACL Vendor DLLs/SOs 220 for each vendor in the received or customized FPACL vendor list 240. In one embodiment, hardware configuration management software application 255 appends to the FPACL vendor name an appropriate extension. For instance, the extension "DLL" may be appended to the FPACL vendor's name to form the filename to be located within the predetermined directory structure.

If a DLL/SO is not found for a FPACL vendor in the FPACL vendor list 240, then configuration for that FPACL vendor is skipped 387 and the process proceeds with the next listed FPACL vendor. In certain embodiments a warning, error, or exception may be thrown for each skipped FPACL vendor 387. If an FPACL vendor DLL/SO is found, then the INTEL® AMT device 245 is configured utilizing the found DLL/SO 388. The FPACL vendor must provide for all required hardware configurations in the DLL. An attempt is made to locate an entry point in the DLL/SO with a predetermined signature. If an entry point is not located, then configuration or provisioning for that FPACL vendor will be skipped and a warning, error, or exception may be thrown for the skipped FPACL vendor (not shown). If an entry point is located then the hardware configuration management software application 255 will invoke the function associated with the entry point and pass the function an XML document with a predetermined format. The XML document contains all the information required for accessing, in order to provision, the INTEL® AMT device 245, such as the PID/PPS key pair, userid, password, and any other necessary parameter. In one example embodiment, the function returns a zero if successful while any other value is returned upon failure.

The FPACL vendor must not change the administrator username or password through the executed function. Allowing a FPACL vendor to change the administrator username or password might cause failure in the configuration process for other FPACL vendors. Next, the hardware configuration management software application 255 checks to see if there is another FPACL vendor in the FPACL vendor list 389. Steps 386 through 389 are repeated for each FPACL vendor listed in the received FPACL vendor list 240.

One example implementation allows for configuration of the INTEL® AMT device 245 according to the configuration requirements of non-FPACL ISVs during a post-configuration step. The hardware configuration management software application 255 may locate a non-FPACL vendor list at step 390. In one example embodiment, the non-FPACL vendor list is contained in a text file located in a predetermined directory structure. In another embodiment, the non-FPACL vendor list may be stored as database entries. The same process stated above with regards to FPACL vendors is followed for the list of non-FPACL vendors. In step 391, the hardware configuration management software application 255 attempts to locate in the central server 250 directory structure a corresponding non-FPACL Vendor DLLs/SOs 215 for each vendor in the located non-FPACL vendor list.

If a DLL/SO is not found for a non-FPACL vendor in the non-FPACL vendor list, then configuration for that non-FPACL vendor is skipped 392 and the process proceeds with the next listed non-FPACL vendor. In certain embodiments a warning, error, or exception may be thrown for each skipped FPACL vendor 392. If an FPACL vendor DLL/SO is found, then the INTEL® AMT device 245 is configured utilizing the found DLL/SO 388. The non-FPACL vendor must provide for all required hardware configurations in the DLL. An attempt is made to locate an entry point in the DLL/SO with a predetermined signature. If an entry point is not located, then configuration or provisioning for that non-FPACL vendor will be skipped and a warning, error, or exception may be thrown for the skipped FPACL vendor (not shown). If an entry point is located then the hardware configuration management software application 255 will invoke the function associated with the entry point and pass it an XML document in a predetermined format. In one example embodiment, the function returns a zero if successful while any other value is returned upon failure.

The non-FPACL vendor must not change the administrator username or password through the executed function. Allowing a non-FPACL to change the administrator username or password might cause failure in the configuration process for other non-FPACL vendors. Next, the hardware configuration management software application 255 checks to see if there is another non-FPACL vendor in the non-FPACL vendor list 394. Steps 391 through 394 are repeated for each non-FPACL vendor listed in the located non-FPACL vendor list.

It is not a limitation of the present invention that only non-FPACL vendor configuration occurs during post-configuration of the INTEL® AMT device 245. In one embodiment, a file located in a predetermined directory structure contains a list of DLLs that are located in a predetermined directory structure. These DLLs are executed during post-configuration of the INTEL® AMT device 245 to retrieve further information about the INTEL® AMT device 245, to further configure the INTEL® AMT device 245, or any other suitable post-configuration process.

After post-configuration is completed, the INTEL® AMT device's 245 administrator username and password are changed 395 according to corresponding parameters provided for in the mapping file 205. Step 395 prevents possible security exposure by not allowing ISVs to log any secure information during the configuration process as any username or password information utilized during the configuration process is changed. The hardware configuration management software application 255 then waits for another connection and initiation request, "HELLO" message, from any another INTEL® AMT device 24 connected via the network 16 in step 396. If another "HELLO" message is received, the hardware configuration management software application 255 begins the hardware configuration process starting again from step 300.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing remote hardware configuration management for one or more heterogeneous computers utilizing a LAN controller hardware with imbedded remote management capabilities, the method comprising:
   receiving an initiation request from the LAN controller;
   requesting a list comprising a plurality of Free Partner Access Control List (FPACL) vendors from a LAN controller with imbedded remote management capabilities, each FPACL vendors comprising an Independent Software Vendor (ISV); and
   for each FPACL vendor of the request list:
      determining one or more configuration requirements that are specific to the respective vendor of each requested list; and
      remotely configuring, by one or more processors, the LAN controller based, at least in part, on at least one of the configuration requirements that are specific to the FPACL vendor of each requested list,
   wherein the plurality of FPACL vendors, each comprising the ISV, are configured to provide the hardware configuration management for one of the heterogeneous computers.

2. The method of claim 1, wherein for at least one of the FPACL vendors a corresponding FPACL vendor file exists; wherein the FPACL vendor file includes the configuration requirements.

3. The method of claim 2, wherein the FPACL vendor file is a dynamically linked file.

4. The method of claim 2, wherein the FPACL file is a shared object file.

5. The method of claim 1, wherein one or more vendor specific APIs provide for configuring the LAN controller based, at least in part on, configuration requirements of at least one of the FPACL vendors.

6. The method of claim 1, wherein the LAN controller is configured using TLS communication protocol technology.

7. The method of claim 1, further comprising:
storing one or more message parameters;
wherein the initiation request includes one or more message parameters;
wherein at least one of the message parameters is a unique identifier;
wherein the unique identifier maps to at least one of the configuration requirements; and
wherein the LAN controller is further configured based, at least in part, on the unique identifier.

8. The method of claim 1, further comprising:
generating a username for the LAN controller;
generating a password for the LAN controller;
wherein the username and the password are generated based, at least in part, on at least one of the message parameters;
changing the username and the password after configuring the LAN controller; and
determining if a certificate exists on the LAN controller, wherein:
if the certificate exists then communicating using TLS protocol; and
if the certificate does not exist then communicating using non-TLS protocol.

9. The method of claim 8, wherein the certificate is generated by a certificate of authority server.

10. The method of claim 1, further comprising:
retrieving a PPS, wherein the PPS is retrieved from a pre-determined map file based, at least in part, on a PID;
wherein the initiation request includes one or more message parameters; and
wherein at least one of the message parameters is the PID.

11. The method of claim 1, further comprising:
determining a key length supported by the LAN controller;
generating a private key, wherein the private key is generated based, at least in part, on the key length;
generating a certificate, wherein the certificate is generated based, at least in part, on the key length;
generating a random number generator key;
setting a time on the LAN controller, wherein the time is set using a network time realm so as to provide for mutual authentication;
deleting existing trusted root certificates on the LAN controller;
generating a trusted root certificate, a trusted domain list and a certificate revocation list on the LAN controller; and
storing on the LAN controller the private key, the certificate, the random number generator key, the time, the trusted root certificate, the trusted domain list and the trusted revocation list.

12. The method of claim 1, further comprising:
determining if a non-FPACL vendor list file exists;
determining one or more non-FPACL vendor configuration requirements for at least one of the non-FPACL vendors listed in the non-FPACL vendor list file; and
configuring the LAN controller based, at least in part, on at least one of the non-FPACL vendor configuration requirements.

13. The method of claim 1, wherein the LAN controller is an INTEL® AMT device.

14. The method of claim 1, the requesting one or more FPACL vendors further comprising:
requesting one or more FPACL vendors that are each a partner of INTEL.

15. The method of claim 1, further comprising:
for each FPACL vendor of the list:
passing one or more parameters received in the initiation request from the LAN controller to a routine supplied by the respective FPACL vendor; and
remotely configuring the LAN controller by executing instructions included in the routine supplied by the respective FPACL vendor.

16. A system for remotely configuring one or more heterogeneous computers utilizing a LAN controller hardware with imbedded remote management capabilities comprising:
a processor;
a communication link between the processor and the heterogeneous computers, wherein at least one of the heterogeneous computers utilize at least one LAN controller hardware;
a memory connected to the processor;
a hardware configuration management software application stored in the memory and operative to control the operation of the processor;
a server Free Partner Access Control List (FPACL) vendor list stored in the memory; and
the processor operative with the hardware configuration management software application to:
request a list comprising a plurality of FPACL vendor from each LAN controller, each FPACL vendor comprising an Independent Software Vendor (ISV) that is a partner of the manufacture of the LAN controller;
receive at least one of the FPACL vendor list;
determine if the server FPACL vendor list contains custom configuration requirements,
wherein if the server FPACL vendor list contains custom configuration requirements then overwrite each of the received FPACL vendor lists with the server FPACL vendor list, and
wherein if the server FPACL vender list does not contain custom configuration requirements, the utilize the received FPACL vendor lists;
determine one or more FPACL vendor configuration requirement for at least one of the FPACL vendor listed in either the received FPACL vendor list or the server FPACL vendor list; and
remotely configure the LAN controller associated with each received FPACL vendor list based, at least in part, on at least one of the FPACL vendor configuration requirements,
wherein the plurality of FPACL vendors, each comprising the ISV, are configured to provide the hardware configuration management for one of the heterogeneous computers.

17. The system of claim 16, further comprising:
a non-FPACL vendor list stored in the memory;
wherein the processor is further operative with the hardware configuration management software application to:
determine one or more non-FPACL vendor configuration requirements for at least one of the non-FPACL vendors listed for each received non-FPACL vendor list; and
configure each LAN controller based, at least in part, on at least one of the non-FPACL vendor configuration requirements.

18. The system of claim 17, wherein the LAN controller is an INTEL® AMT device.

19. A non-transitory computer readable storage medium encoded with processing instructions for implementing a method for remotely configuring one or more heterogeneous computers utilizing a LAN controller hardware with imbedded remote management capabilities, the processing instructions for directing a computer to perform the steps of:
- listening for socket connections on a configurable port;
- receiving an initiation request from a LAN controller;
- requesting a list comprising a plurality of Free Partner Access Control List (FPACL) vendors from the LAN controller, each FPACL vendor comprising an Independent Software Vendor (ISV); and
- for each FPACL vendor of the requested list:
  - determining one or more configuration requirements that are specific to each FPACL vendor of the list; and
  - remotely configuring the LAN controller based, at least in part, on at least one of the configuration requirements that are specific to each FPACL vendor of the list,
- wherein the plurality of FPACL vendors, each comprising the ISV, are configured to provide the hardware configuration management for one of the heterogeneous computers.

20. The non-transitory computer readable storage medium of claim 19, the processing instructions further directing the computer to perform the steps of:
- storing one or more message parameters;
- wherein the initiation request includes one or more message parameters;
- wherein the message parameters include at least one unique identifier;
- wherein the unique identifier maps to at least one of the vendor configuration requirements; and
- wherein the LAN controller is further configured based, at least in part, on the unique identifier.

21. The non-transitory computer readable storage medium of claim 19, the processing instructions further directing the computer to perform the steps of:
- determining if a non-FPACL vendor list file exists;
- determining one or more non-FPACL vendor configuration requirements for at least one of the non-FPACL vendors listed in the non-FPACL vendor list file; and
- configuring the LAN controller based, at least in part, on at least one of the non-FPACL vendor configuration requirements.

* * * * *